United States Patent
Wang

(10) Patent No.: US 10,670,417 B2
(45) Date of Patent: Jun. 2, 2020

(54) NAVIGATION SYSTEM WITH OUTPUT CONTROL MECHANISM AND METHOD OF OPERATION THEREOF

(71) Applicant: Telenav, Inc., Sunnyvale, CA (US)

(72) Inventor: Liang Wang, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 45 days.

(21) Appl. No.: 14/711,366

(22) Filed: May 13, 2015

(65) Prior Publication Data

US 2016/0334228 A1 Nov. 17, 2016

(51) Int. Cl.
*G01C 21/36* (2006.01)

(52) U.S. Cl.
CPC ..... *G01C 21/3641* (2013.01); *G01C 21/3679* (2013.01); *G01C 21/3691* (2013.01); *G01C 21/3697* (2013.01)

(58) Field of Classification Search
CPC .............. G01C 21/3655; G01C 21/20; G01C 21/3629; G01C 21/3697; G01C 21/3407; G01C 21/3664; G01C 21/367; G01C 21/3688; B60W 20/00; B60W 2520/10; B60W 2550/402; G01S 19/14; G01S 19/49; G08G 1/166; G08G 1/167; G10L 15/20; G10L 21/0208; G10L 21/0232; H04H 20/62
USPC ....... 701/408, 409, 414, 420, 425, 431, 456, 701/469, 532, 533, 36, 410; 703/2; 704/226, 233; 375/262; 725/70; 180/65.265; 455/414.1, 412.2; 381/57, 381/71.7, 107; 382/100; 340/988
See application file for complete search history.

(56) References Cited

U.S. PATENT DOCUMENTS

| | | | |
|---|---|---|---|
| 4,864,246 A | 9/1989 | Kato et al. | |
| 5,394,332 A * | 2/1995 | Kuwahara | G01C 21/3629 340/988 |
| 5,984,366 A * | 11/1999 | Priddy | G06Q 20/347 235/380 |
| 6,091,836 A * | 7/2000 | Takano | G06K 9/00268 382/100 |
| 6,405,341 B1 * | 6/2002 | Maru | H03M 13/01 375/262 |
| 7,663,502 B2 * | 2/2010 | Breed | B60N 2/853 340/12.25 |
| 7,693,626 B2 * | 4/2010 | Breed | B60C 23/0408 701/34.4 |

(Continued)

FOREIGN PATENT DOCUMENTS

CN 102100011 B * 1/2014 ............. H04B 15/00

OTHER PUBLICATIONS

Google Patents Translation of Chinese Patent Pub. No. CN102100011B entitled "Pre-configuration and control of radio frequency noise cancellation" (downloaded on Jun. 26, 2019) (published in english on Jun. 16, 2011).*

(Continued)

*Primary Examiner* — Jean Paul Cass

(74) *Attorney, Agent, or Firm* — Perspectives Law Group, Corp.

(57) ABSTRACT

A method of operation of a navigation system includes: calculating a location for representing the location of a device; and generating with a control unit an output characteristic based on the location for controlling a content communication to a user through the device.

20 Claims, 6 Drawing Sheets

(56) References Cited

U.S. PATENT DOCUMENTS

| | | | | |
|---|---|---|---|---|
| 7,887,089 | B2* | 2/2011 | Breed | B60R 21/01536 |
| | | | | 180/272 |
| 7,889,096 | B2* | 2/2011 | Breed | G08C 17/00 |
| | | | | 340/10.1 |
| 8,169,311 | B1* | 5/2012 | Breed | B60N 2/2806 |
| | | | | 340/438 |
| 9,102,220 | B2* | 8/2015 | Breed | B60R 25/255 |
| 9,940,753 | B1* | 4/2018 | Grundhofer | G06T 19/006 |
| 10,499,216 | B2* | 12/2019 | Tran | A63B 24/0062 |
| 2003/0050751 | A1* | 3/2003 | Fukushima | G01C 21/3407 |
| | | | | 701/420 |
| 2004/0204828 | A1* | 10/2004 | Ebi | G01C 21/3608 |
| | | | | 701/431 |
| 2004/0250083 | A1* | 12/2004 | Schwab | G06Q 30/0601 |
| | | | | 713/182 |
| 2005/0089177 | A1 | 4/2005 | Hughes et al. | |
| 2007/0073524 | A1* | 3/2007 | Song | G01C 21/20 |
| | | | | 703/2 |
| 2007/0233378 | A1* | 10/2007 | Tanaka | G01C 21/3664 |
| | | | | 701/456 |
| 2008/0069379 | A1 | 3/2008 | Chang | |
| 2008/0271093 | A1* | 10/2008 | Nabeshima | H04B 7/18523 |
| | | | | 725/70 |
| 2009/0143982 | A1* | 6/2009 | Katzer | G01C 21/3629 |
| | | | | 701/469 |
| 2009/0294193 | A1* | 12/2009 | Okuno | B60W 10/06 |
| | | | | 180/65.265 |
| 2010/0094533 | A1* | 4/2010 | Wu | G01C 21/36 |
| | | | | 701/532 |
| 2010/0158275 | A1* | 6/2010 | Zhang | H03G 3/32 |
| | | | | 381/107 |
| 2010/0198496 | A1* | 8/2010 | Victor | G01C 21/3655 |
| | | | | 701/533 |
| 2010/0241308 | A1* | 9/2010 | Kikuchi | B60H 1/00278 |
| | | | | 701/36 |
| 2011/0106421 | A1* | 5/2011 | Tang | G01C 21/3697 |
| | | | | 701/533 |
| 2011/0106442 | A1* | 5/2011 | Desai | G01S 5/0072 |
| | | | | 701/532 |
| 2011/0207443 | A1* | 8/2011 | Potter | H04H 20/62 |
| | | | | 455/414.1 |
| 2012/0166076 | A1* | 6/2012 | Hardy | G01O 21/3415 |
| | | | | 701/414 |
| 2012/0173135 | A1* | 7/2012 | Gutman | G01C 21/3469 |
| | | | | 701/408 |
| 2012/0239392 | A1* | 9/2012 | Mauger | G10L 21/0216 |
| | | | | 704/226 |
| 2013/0331067 | A1* | 12/2013 | Coussemaeker | H04M 1/72569 |
| | | | | 455/412.2 |
| 2014/0067265 | A1* | 3/2014 | Maston | G01C 21/3697 |
| | | | | 701/533 |
| 2014/0156236 | A1* | 6/2014 | Haws | G06F 19/12 |
| | | | | 703/2 |
| 2014/0200887 | A1* | 7/2014 | Nakadai | G10L 15/20 |
| | | | | 704/233 |
| 2014/0278059 | A1* | 9/2014 | Gunther | G01C 21/3655 |
| | | | | 701/414 |
| 2014/0369516 | A1* | 12/2014 | Rhee | G10K 11/002 |
| | | | | 381/71.7 |
| 2015/0011195 | A1 | 1/2015 | Li | |
| 2015/0019122 | A1* | 1/2015 | Wang | G09B 29/007 |
| | | | | 701/409 |
| 2015/0134237 | A1* | 5/2015 | Jiang | G01C 21/3679 |
| | | | | 701/425 |
| 2015/0134456 | A1* | 5/2015 | Baldwin | G06Q 30/0267 |
| | | | | 705/14.64 |
| 2015/0338227 | A1* | 11/2015 | Kruecken | G01C 21/3697 |
| | | | | 701/410 |
| 2016/0149547 | A1* | 5/2016 | Rider | H03G 3/04 |
| | | | | 381/57 |
| 2016/0180863 | A1* | 6/2016 | Ozcan | H03G 3/005 |
| | | | | 381/57 |
| 2016/0334228 | A1* | 11/2016 | Wang | G01C 21/3641 |

OTHER PUBLICATIONS

Google Machine Translation of the Chinese Patent Application Pub. No. CN102100011B entitled "Pre-configuration and control of radio frequency noise cancellation". (Jul. 22, 2019 downloaded).*

GPS Based Volume Control—Forum Post, Apr. 2011, by 2Hyper http://www.m109riders.com/forums/showthread.php?t=166158.

Automatic Sound Levelizer—Video, Aug. 24, 2012, by Luther Brookdale Toyota https://www.youtube.com/watch?v=Drbr7P_b3p8.

* cited by examiner

NAVIGATION SYSTEM WITH OUTPUT CONTROL MECHANISM AND METHOD OF OPERATION THEREOF

TECHNICAL FIELD

An embodiment of the present invention relates generally to a navigation system, and more particularly to a system with an output control.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding the use of location. The possible applications for preference setting management based on the location have yet been fully utilized.

Thus, a need still remains for a navigation system with an output control mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: calculating a location for representing the location of a device; and generating with a control unit an output characteristic based on the location for controlling a content communication to a user through the device.

An embodiment of the present invention provides a navigation system, including: a communication interface configured to calculate a location for representing the location of a device; and a control unit, coupled to the communication interface, configured to generate an output characteristic based on the location for controlling a content communication to a user through the device.

An embodiment of the present invention provides a non-transitory computer readable medium including instructions for a navigation system, including: calculating a location for representing the location of a device; and generating an output characteristic based on the location for controlling a content communication to a user through the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
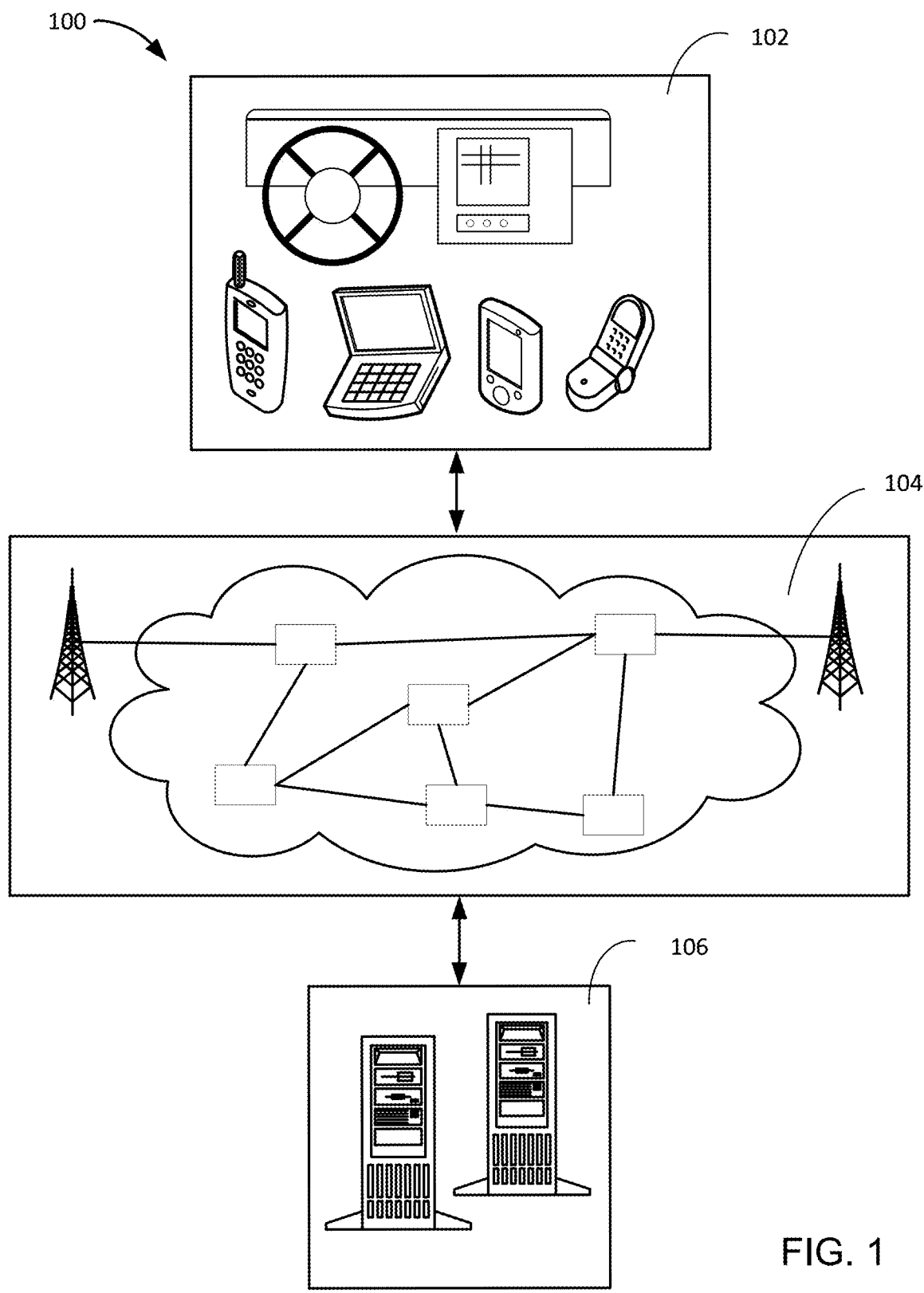
FIG. 1 is a navigation system with an output control mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with an output control mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further can be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, such as the car, the truck, the bus, or the train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
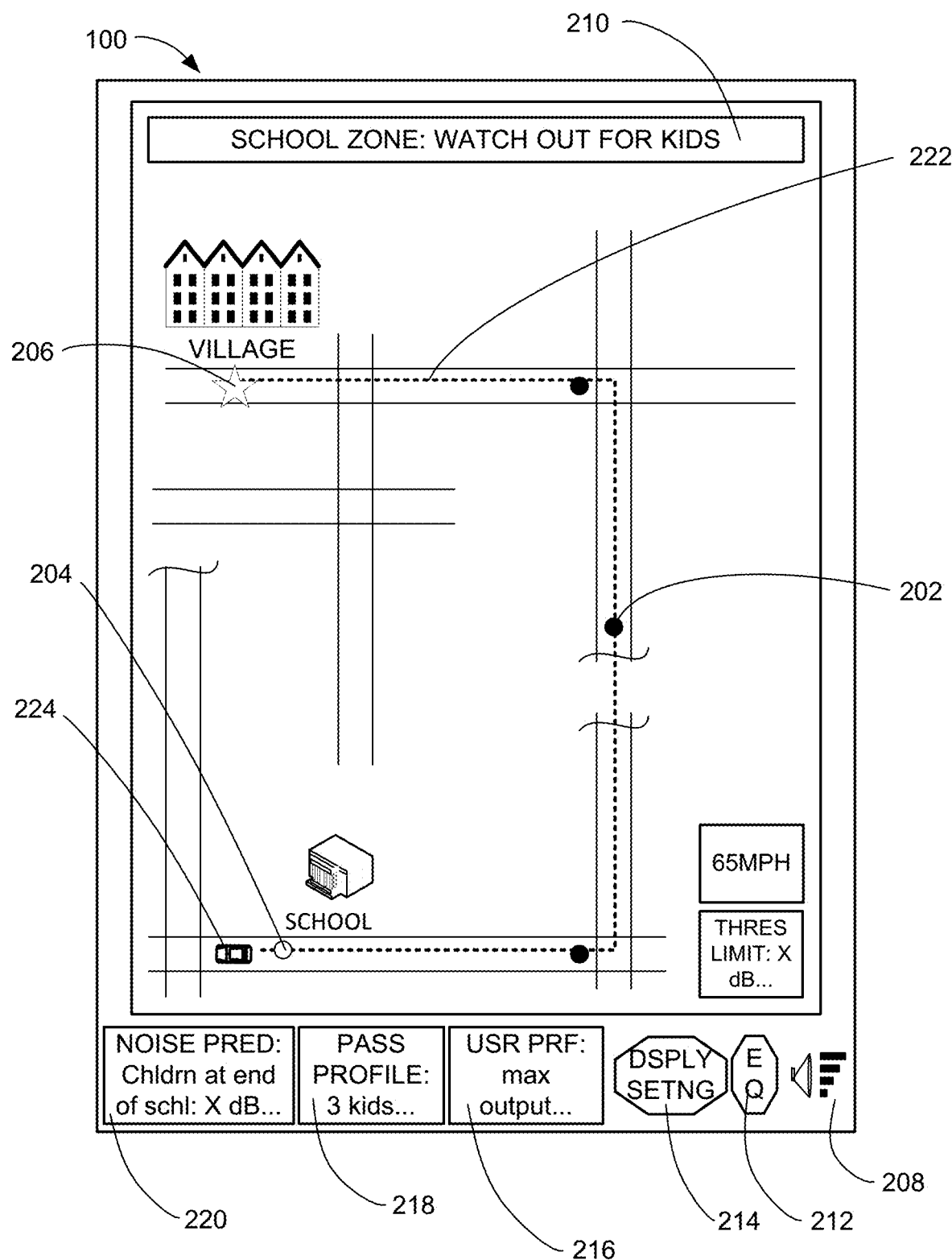
FIG. 2 is an example of a display interface for the navigation system.

Referring now to FIG. 2, therein is shown an example of a display interface for the navigation system 100. The display interface can show a location 202, such as a current location 204 or a future location 206, an output characteristic 208, a content communication 210, a voice quality 212, a visual quality 214, a speed, user preferences 216, a passenger profile 218, a noise prediction 220, or a combination thereof.

The location 202 can represent the location determined by the navigation system 100. The location 202 can be represented as an X, Y coordinate, longitudinal value, latitudinal value, number block followed by a street name, or a combination thereof.

The location 202 can include a geographical location or area targeted for analysis by the navigation system 100. For example, the location 202 can be a point on a preferred route 222 suggested by the navigation system. Also for example, the location 202 can be the current location 204 of the first device 102 of FIG. 1 as indicated on a navigation map by a continuously updated indicator.

Also for example, the location 202 can be the future location 206 indicated as a desired location or destination of the route on the navigation map. The future location 206 can include the geographic location the user or the first device 102 is estimated to be at a future time after the current time corresponding to the current location 204. As a more specific example, the future location 206 can be a location on the preferred route 222 expected or estimated for the user or the first device 102 at the future time. Also as a more specific example, the future location 206 can be a location specified for a calendar event for the user occurring at the future time.

The desired location or the destination of the route can include a single destination or can include a set of multiple destinations along a single route. The destination, the preferred route 222, or a combination thereof can be provided by the user through an interface and can be displayed by the navigation system 100.

The preferred route 222 can include a set of continuous paths, segments, nodes, or a combination thereof for traversing from a location to the desired location. The preferred route 222 can be calculated by the navigation system 100 by optimizing time, distance, noise level, or a combination thereof. Further, the preferred route 222 can be determined by avoiding events or obstacles.

The navigation system 100 can account for the noise in processing and communicating information with the user. The noise can include an interference with information generated or communicated by the first device 102, the second device 106, or a combination thereof for communication directly to the user. The noise can be from a source external to the source of intended communication. For example, the noise can be from a device, a person, a situation, environment, or a combination thereof.

The noise can further be from the device sourcing the intended communication. For example, the noise can include other independent communication, such as for other applications or processes separate from the application or the process generating the intended communication. Also for example, the noise can include variations or imperfections in the output of the intended communication, such as due to hardware limitation, available capabilities, device temperature, or a combination thereof.

The noise can include various different influences. For example, the noise can be sound, light, factors influencing communication medium, or a combination thereof. As a more specific example, the noise can include sounds independent or separate from the intended communication utilizing audible output.

Also as a more specific example, the noise can include light generated independent or separate from the intended communication utilizing visual output. Also as a more specific example, the noise can include or be affected by characteristics of an enclosure for reflecting or distorting sound, reflective surfaces relative to the visual output, angles relative to the user and various sources, or a combination thereof. Also as a more specific example, the noise can include or be affected by clarity or transmission capacity of the environment, such as for fog or smoke in the air, a blockage or a structure between the user and an audible noise source, or a combination thereof.

The output characteristic 208 is a representation of a trait associated with the intended communication. The output characteristic 208 can include a magnitude, a sharpness or a contrast, a tempo or a timing, or a combination thereof.

The output characteristic 208 can include a voice quality 212 or a visual quality 214 of a content communication 210 for the navigation system 100. The output characteristic 208 can be applicable for the content communication 210 displayed on or audibly recreated by the navigation system 100. The content communication 210 can include the intended communication, such as navigation direction, alerts, relevant information, or a combination thereof. The content communication 210 can use audible communication, visual communication, or a combination thereof to relay information to the user.

The output characteristic 208 can be adjusted by the navigation system 100 using a noise prediction 220 calculated by the navigation system 100. The voice quality 212 can represent a characteristic or a trait for sounds utilized for audible communication to the user from the navigation system 100. The voice quality 212 can include the speed or cadence for the audible communication, the tone, the volume, or combination thereof of the audio output from the navigation system 100.

The visual quality 214 can represent a characteristic or a trait for displays or images utilized for visual communication to the user from the navigation system 100. The visual quality 214 can include the brightness, the contrast, the color, the hue, or combination thereof of the visual output from the navigation system 100.

Indicators for the voice quality 212, the visual quality 214, and a speed can be displayed on the navigation system 100. The speed can represent the magnitude of the rate of movement of a vehicle 224.

The noise prediction 220 is a forecast of the expected noise level at a location. The noise prediction 220 can be calculated based on identifying one or more sources or causes of the noise applicable to the one or more of the locations. The noise prediction 220 can be calculated based on estimating a magnitude, a characteristic, an effect, or a combination thereof for the noise from each of the applicable sources or causes.

The noise prediction 220 can include the magnitude, the characteristic, the effect, the applicable sources or causes, or a combination thereof. The noise prediction 220 can estimate an amount or intensity, a type or category, or a combination thereof for the noise perceivable or likely perceived at one or more locations along the route. The noise prediction 220 can be calculated using an algorithm based on location noise level and the user preferences 216 to decide if the noise level at a location will fall above or below the threshold limit.

The user preferences 216 can include a representation of one or more characteristics favored or desired by a user (not shown) for receiving communicated information. The user preferences 216 can include one or more settings or configurations for the first device 102 of FIG. 1, the second device 106 of FIG. 1, or a combination thereof associated with communicating with the user. The user preferences 216 can be displayed on the navigation system 100. The user preferences 216 can be used by the navigation system 100 to calculate the output characteristic 208 at the location 202.

For example, the user preferences 216 can include display settings or configuration, audio settings or configuration, haptic response settings or configuration, or a combination thereof. As a more specific example, the user preferences 216 can include a brightness level or a contrast setting for the display, a specific color for corresponding information, a specific portion of the display or a particular light emitting diode for the corresponding information, a volume level or a specific sound quality, a vibration pattern, or a combination thereof.

The user preferences 216 can further include contextual settings, such as for certain times of day or predetermined situations. The contextual settings can be described or represented by contextual data, such as time of day, location of the user, reason or goal for an activity associated with the user, significance or evaluation attributed thereto by the user, a person or an entity in proximity to the user, a pattern thereof, or a combination thereof.

As a more specific example, the user preferences 216 can include a preference or a pattern of whether the user is interested in talking with the members of the vehicle 224 at the beginning of the trip. The navigation system 100 can use the user preferences 216 to assign threshold values and limit the voice quality 212 until a particular time or distance from the destination. The navigation system 100 can use the threshold values to provide guidance instructions without interfering with the user's conversation so that the guidance instructions are clearly understood.

The passenger profile 218 can represent a being within the vehicle 224 with the user. The passenger profile 218 can include one or more people, pets, or a combination thereof in the cabin of the vehicle 224. The passenger profile 218 can include the one or more persons not operating or maneuvering the vehicle 224.

The navigation system 100 can use information regarding the passenger profile 218 to calculate the noise level contribution in the vehicle 224 from the passenger profile 218. The passenger profile 218 can include the number of passengers, the relationship between passengers, the age of passengers, or a combination thereof. For example, if there are more passengers in the vehicle 224, the noise level can be expected to be greater than if there was only one passenger. Similarly, if the vehicle 224 contained four children the noise level would be expected to be greater than if there were only adults in the vehicle 224.

Figure 3:
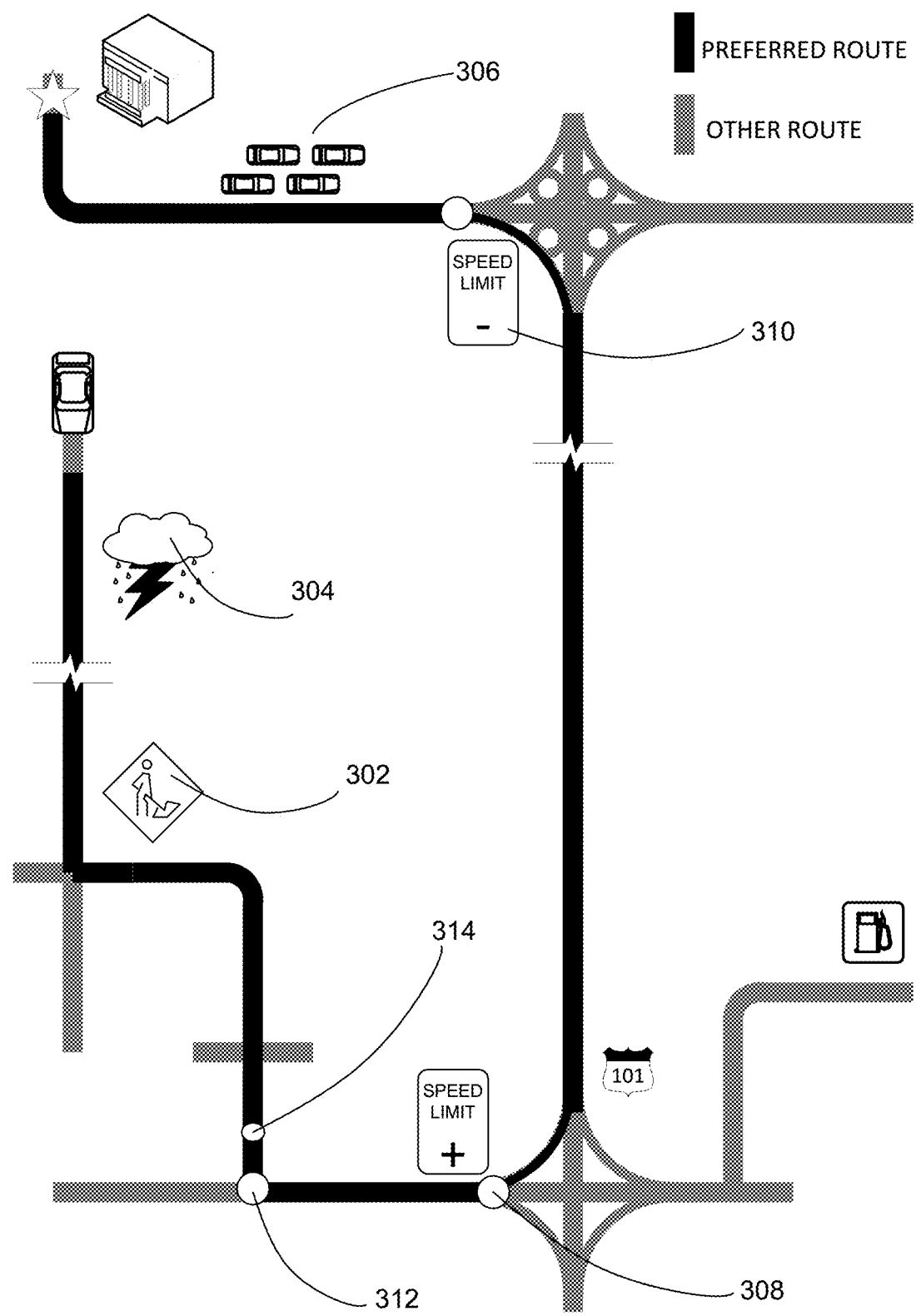
FIG. 3 is an example of the preferred route.

Referring now to FIG. 3, therein is shown an example of the preferred route 222 of FIG. 2. The preferred route 222 can include areas on the route where the noise level changes at or corresponds to the location 202 of FIG. 2 on the route. The example preferred route 222 includes the location 202 where a road condition 302 changes, a weather condition 304 changes, a traffic condition 306 changes, and a specific maneuver 308 occurs.

The road condition 302 can represent the quality of the road in a particular location. The road condition 302 can include the material the road is made of, the age of the road, imperfections or damages on the road surface, the stability of the road type of road, embedded structures in the road, or a combination thereof. For example, the road condition 302 can include gravel roads, paved roads, asphalt or concrete, potholes, cracked pavement, pavement faulting, pavement wear, road markers, temporary covers, or a combination thereof. The road condition 302 can be used for representing construction along or adjacent to the preferred route 222.

The road condition 302 can be used for representing the noise level contribution based on the road condition 302. For example, driving on a gravel road can produce a greater noise level contribution than driving on a paved road. Similarly, if a stretch of highway includes an excessive number of potholes, the noise level contribution can be greater than if the highway was newly paved. The navigation system 100 can use information regarding the road condition 302 to calculate a noise level contribution from differences in the road at a particular location.

The weather condition 304 can represent the atmospheric condition at a location. The weather condition 304 can include rain, wind, thunder, snow, sleet, hail, or a combination thereof at a location. For example, a hailstorm can affect only a limited area or a single neighborhood along a destination route. Similarly, a certain stretch of highway can be known for high winds.

The weather condition 304 can be used to represent the noise contribution at a location based on the atmospheric condition. For example, during a hail storm the noise level inside the vehicle 224 of FIG. 2 would increase due to the hail hitting the vehicle 224.

The traffic condition 306 can represent the vehicle 224 or pedestrian movement at a location. The traffic condition 306 can be based on a number or a type of vehicles, pedestrians, bicyclists, or a combination thereof at the location affecting the speed of the vehicle 224. The traffic condition 306 can affect the speed of the vehicle 224. For example, the vehicle 224 would need to travel at a slower speed in a particular a stretch of highway during a period of heavy traffic.

The navigation system 100 can use information regarding the traffic condition 306 to calculate the noise level contribution differences in traffic at the location 202. The noise level based on the traffic condition 306 would be different during periods of heavy traffic for the same stretch of highway than during periods of no traffic.

The specific maneuver 308 can be any change in direction of the vehicle 224. The specific maneuver 308 can include a speed change 310, reversing, maintaining a speed or velocity, a right turn, a left turn, a U-turn, or combination thereof. The speed change 310 can include a stop, an acceleration state, a deceleration state, or combination thereof.

The maneuver condition 312 is an attribute or a characteristic on or along the preferred route 222 associated with a location for the specific maneuver 308. For example, the maneuver condition 312 can include coordinates or geographic identifiers of the location for the specific maneuver 308. Also for example, the maneuver condition 312 can include conditions, such as red light, traffic delay or accident along the route, presence or number of pedestrians estimated or at the location, number of vehicles at the location or expected to perform the same maneuver, or a combination thereof.

The navigation system can set a trigger condition 314 to represent a condition associated with the maneuver condition 312 for initiating an action or a process. The trigger condition 314 can be based on time before reaching or arriving at a location, time before an event, distance from a location, a condition or a parameter preceding the maneuver condition 312, or combination thereof.

The navigation system 100 can use the information from the specific maneuver 308 to adjust the noise level contribution at a location. For example, the noise level contribution could be different at an intersection if the vehicle 224 travels through the intersection versus turning left due to changes in speed or pauses prior to the turn.

Figure 4:
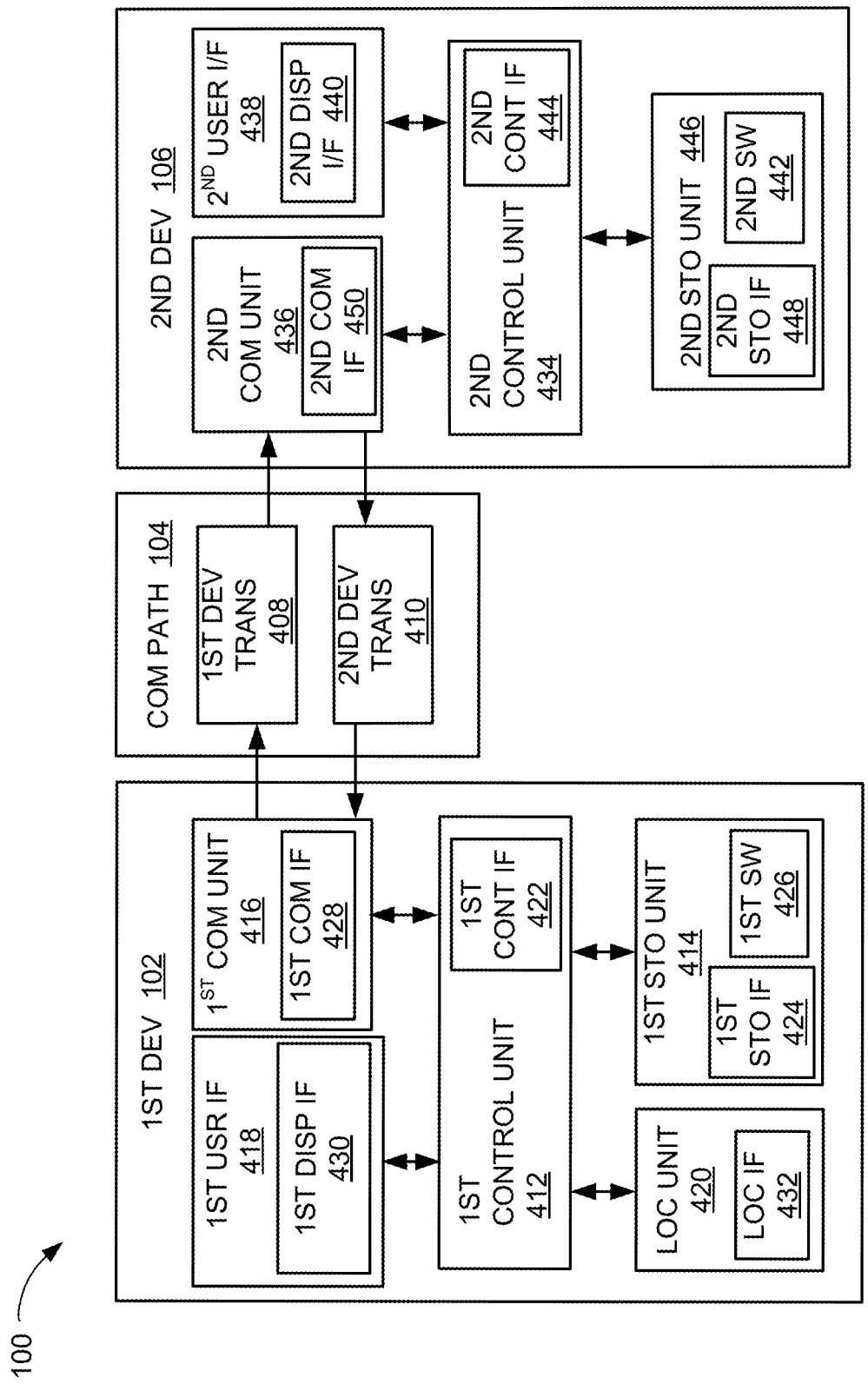
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the network 104 via the first communication unit 416.

The location unit 420 can generate location information, current heading, current acceleration, and current speed of the first device 102, as examples. The location unit 420 can be implemented in many ways. For example, the location unit 420 can function as at least a part of the global positioning system, an inertial navigation system, a cellular-tower location system, a pressure location system, or any combination thereof. Also, for example, the location unit 420 can utilize components such as an accelerometer or GPS receiver.

The location unit 420 can include a location interface 432. The location interface 432 can be used for communication between the location unit 420 and other functional units in the first device 102. The location interface 432 can also be used for communication external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, a camera, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The navigation system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
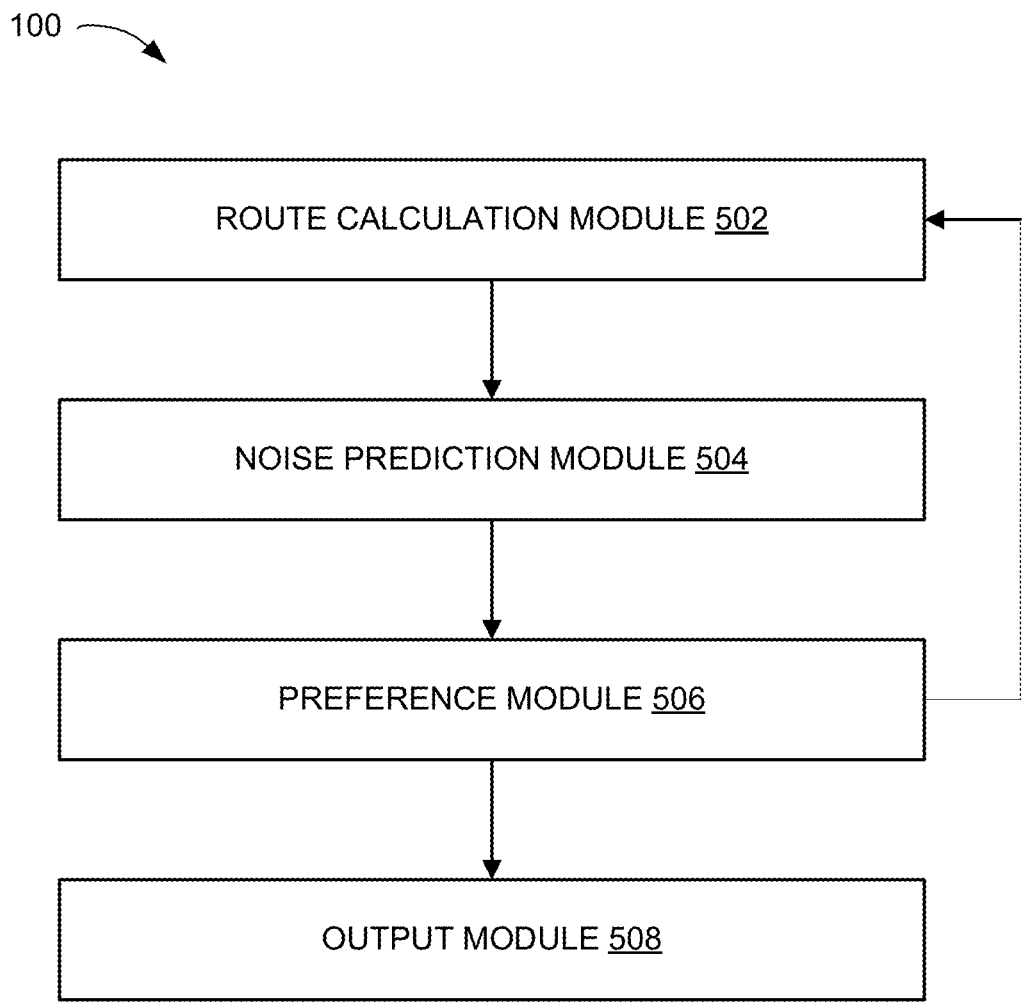
FIG. 5 is a control flow of the navigation system.

Referring now to FIG. 5, therein is shown a control flow of the navigation system 100. The navigation system 100 can include a route calculation module 502, a noise prediction module 504, a preference module 506, an output module 508, or a combination thereof.

The route calculation module 502 can be coupled to the noise prediction module 504, the preference module 506, or a combination thereof using wired or wireless connections, by having an output of one module as an input of the other module, by having operations of one module influence operations of the other module, or a combination thereof. Similarly the noise prediction module 504 can be coupled to the preference module 506, the preference module 506 can be coupled to the output module 508, or a combination thereof as described above.

The route calculation module 502 is configured to calculate a route for guiding a user to a location. The route calculation module 502 can calculate the preferred route 222 of FIG. 2, the maneuver condition 312 of FIG. 3, the trigger condition 314 of FIG. 3, or a combination thereof. The route calculation module 502 can calculate the trigger condition 314 preceding the maneuver condition 312 on the preferred route 222.

The route calculation module 502 can further calculate candidate routes to a destination location. The route calculation module 502 can calculate the preferred route 222 from the candidate routes for representing the preferred route 222 intended for traversal by the user.

The route calculation module 502 can calculate the candidate routes based on calculating a continuous path linking road segments, nodes, or a combination thereof from a starting location to the destination. The route calculation module 502 can calculate the candidate routes from a current location of the user or a designated location.

The route calculation module 502 can calculate the preferred route 222 based on selecting the candidate route optimizing time, distance, noise level, or a combination thereof. Further, the route calculation module 502 can calculate the preferred route 222 by selecting the candidate route avoiding events or obstacles. The route calculation module 502 can use a method, a process, an equation, or a combination thereof predetermined by the navigation system 100 to calculate the candidate routes and to calculate the preferred route 222 using the candidate routes.

The route calculation module 502 can calculate the maneuver condition 312 in or along the preferred route 222. The route calculation module 502 can calculate the maneuver condition 312 as a node or a portion of the segment in the preferred route 222 requiring the user to perform a maneuver. The route calculation module 502 can further calculate the maneuver condition 312 as a state or a condition associated with a node or a portion of the segment in the preferred route 222.

For example, the route calculation module 502 can calculate the maneuver condition 312 based on identifying intersections or locations on roads requiring a turn, a lane change, an entry or exit, a merge, or a combination thereof to follow the preferred route 222. Also for example, the route calculation module 502 can calculate the maneuver condition 312 based on identifying travel state, such as red light or crossing traffic, number vehicles, number of pedestrians, traffic delay or accidents, number of vehicles performing or waiting to perform a specific maneuver 308 of FIG. 3, an estimate thereof, or a combination thereof for a node or a portion of the segment in the preferred route 222.

The route calculation module 502 can further calculate the trigger condition 314. The route calculation module 502 can calculate the trigger condition 314 to provide the content communication 210 of FIG. 2 to the user at the location 202 of FIG. 2 on the preferred route 222 or at a time, a location, or an event preceding the maneuver condition 312. The route calculation module 502 can calculate the trigger condition 314 for notifying the user of a required or upcoming maneuver through the content communication 210 before reaching the maneuver condition 312.

The route calculation module 502 can calculate the trigger condition 314 using distance, time, user preferences 216 of FIG. 2, circumstantial parameters, or a combination thereof predetermined by the navigation system 100 to determine the trigger condition 314. For example, when approaching a right hand turn, the trigger condition 314 can be set to 1000 feet before the turn.

Also for example, the trigger condition 314 can be set to 2 minutes before the arrival of the exit. Also for example, the route calculation module 502 can set or adjust a distance or a time for the trigger condition 314 based on a number of pedestrians at or near the projected location of the maneuver, a number of vehicles expected to perform a specific maneuver 308 at the location, or a combination thereof.

The route calculation module 502 can calculate the preferred route 222 based on the noise prediction 220 of FIG. 2 and the user preferences 216 for providing the output characteristic 208 of FIG. 2. The route calculation module 502 can calculate the preferred route 222 based on processing result of the noise prediction module 504, the preference module 506, or a combination thereof.

The navigation system 100 can use a feedback mechanism, an iterative mechanism, or a combination thereof to provide the noise prediction 220 to the route calculation module 502. The route calculation module 502 can provide a set of candidate routes for analyzing the noise prediction 220 associated with the set of candidate routes. The route calculation module 502 can calculate the preferred route 222 for providing the content communication 210 with the output characteristic 208 exceeding the noise prediction 220 along the preferred route 222.

The route calculation module 502 can calculate the preferred route 222 based on calculating candidate routes for travelling to the destination. The route calculation module 502 can calculate one or more instances of the maneuver condition 312, the trigger condition 314, or a combination thereof for each instance of the candidate routes.

The route calculation module 502 can pass the candidate routes to the noise prediction module 504. The route calculation module 502 can further receive the noise prediction 220 from the noise prediction module 504 corresponding to the candidate routes. The route calculation module 502 can receive the noise prediction 220 at or corresponding to the one or more instances of the maneuver condition 312, the trigger condition 314, or a combination thereof for each instance of the candidate routes.

The route calculation module 502 can calculate the preferred route 222 as the instance of the candidate route satisfying the output characteristic 208, the user preferences 216, or a combination thereof. The route calculation module 502 can calculate the preferred route 222 as the candidate route with all or most instances of the maneuver condition 312, the trigger condition 314, or a combination thereof with corresponding noise prediction 220 below maximum or extreme output characteristic 208, satisfying the user preferences 216, or a combination thereof. The route calculation module 502 can receive the user preference 216 from the preference module 506.

For example, the route calculation module 502 can calculate the preferred route 222 avoiding any routes where the noise level would exceed a maximum value, avoiding certain road types or regions, or a combination thereof according to the user preferences 216. Also for example, the route calculation module 502 can calculate the preferred route 222 with the output characteristic 208 sufficient to overwhelm or distinguish above the noise prediction 220 along the preferred route 222.

The route calculation module 502 can calculate the location 202 of FIG. 2 for representing the location 202 of the device 102 of FIG. 1. The route calculation module 502 can calculate the location 202 along or adjacent to the preferred route 222, the candidate route, or a combination thereof. The route calculation module 502 can calculate the current location 204 of FIG. 2, the future location 206 of FIG. 2, or a combination thereof corresponding to the device 102.

The route calculation module 502 can display the location 202 using the first user interface 418 of FIG. 4, the second user interface 438 of FIG. 4, or a combination thereof. The route calculation module 502 can calculate the location 202 corresponding to the maneuver condition 312 where the noise level changes along the candidate route. The route calculation module 502 can calculate the location 202 satisfying or corresponding to the distance, the estimated time, the estimated time of an event or a condition, or a combination thereof along or about the preferred route 222, the candidate routes, or a combination thereof according to the maneuver condition 312.

The route calculation module 502 can use the first communication unit 416 of FIG. 4, the second communication unit 436 of FIG. 4, or a combination thereof to communicate the accessed data between devices including location information in calculating the location 202. The route calculation module 502 can use the first storage unit 414 of FIG. 4, the second storage unit 446 of FIG. 4, or a combination thereof to store candidate routes or the location information. The route calculation module 502 can use the first control unit 412 of FIG. 4, the second control unit 434 of FIG. 4, of combination thereof to calculate the preferred route 222, the location 202, or a combination thereof. The route calculation module 502 can further use the location unit 420 of FIG. 4 to calculate the location 202.

The route calculation module 502 can use the location unit 420, the first communication unit 416, the second communication unit 436, the first control unit 412, the second control unit 434, or a combination thereof to calculation the location 202. The route calculation module 502 can use the first user interface 418, the second user interface 438, the first communication interface 428 of FIG. 4, the second communication interface 450 of FIG. 4, or a combination thereof to display information to the user.

The route calculation module 502 can pass information to the noise prediction module 504. After calculating the location 202 on the preferred route 222, the control flow can pass from the route calculation module 502 to the noise prediction module 504. The control flow can pass by having a processing result, such as the location 202, the trigger condition 314, the preferred route 222, the candidate routes, or a combination thereof as an output from the route calculation module 502 to an input of the noise prediction module 504.

For example, the route calculation module 502 can pass the candidate routes, the location 202 along the candidate routes, and the trigger condition 314 corresponding to each of the candidate routes when the preferred route 222 is not set or finalized. The noise prediction module 504, the preference module 506, the route calculation module 502, or a combination thereof can iteratively process the information to set or finalize the preferred route 222.

Continuing with the example, the route calculation module 502 can calculate the preferred route 222 using qualifications for the noise prediction 220 as criteria. As a more specific example, the route calculation module 502 can calculate the preferred route 222 with the noise prediction 220 below a threshold along the entire route.

Also for example, the preferred route 222, the location 202 along the preferred route 222, and the trigger condition 314 to the noise prediction module 504 when the preferred route 222 is set or provided. The prediction module 504, the preference module 506, or a combination thereof can finalize the noise estimations for the preferred route 222 for further processing.

The control flow can further pass by storing the processing result at the location 202 known and accessible to the noise prediction module 504. The control flow can further pass by notifying the noise prediction module 504, such as by using a flag, an interrupt, a status signal, or a combination thereof. The control flow can further pass using a combination of the processes described above.

The noise prediction module 504 is configured to determine the noise prediction 220 at the location 202. The noise prediction module 504 can determine the noise prediction 220 for the current location 204, the future location 206, or a combination thereof. The noise prediction 220 can include the noise prediction 220 corresponding to the trigger condition 314, the maneuver condition 312, or a combination thereof.

The noise prediction module 504 can assign a value estimating the noise level at the location 202, the trigger condition 314, or a combination thereof. The noise prediction module 504 can use the first storage unit 414, the second storage unit 446, or a combination thereof to store the values assigned to the noise prediction 220.

The noise prediction module 504 can determine the noise prediction 220 based on the road condition 302 of FIG. 3. For example, the noise prediction module 504 can determine the noise prediction 220 based on a material making up the surface of road, a condition or a shape of the surface of the road, or a combination thereof at the location 202 or at the location 202 corresponding to the trigger condition 314, the maneuver condition 312, or a combination thereof.

As a more specific example, the noise prediction module 504 can determine noise the noise prediction 220 corresponding to gravel roads, paved roads, asphalt or concrete. The noise prediction module 504 can determine the noise prediction 220 for representing the noise level corresponding to driving on a gravel road, which can produce a greater noise level contribution than driving on a paved road.

Also as a more specific example, the noise prediction module 504 can determine noise prediction 220 corresponding to potholes, cracked pavement, pavement faulting, pavement wear, road markers, temporary covers, a number or a size thereof, a severity thereof, or a combination thereof. The noise prediction module 504 can determine the noise prediction 220 for representing the noise level corresponding to driving on a stretch of road with number of potholes, which can produce a greater noise level contribution than driving on a newly paved road.

The noise prediction module 504 can determine the road condition 302 for the location 202 along the preferred route 222. The noise prediction module 504 can access the road condition 302 for representing various paths or locations, such as included in map data or in a database to determine the noise prediction 220 at the location 202. For example, the noise prediction module 504 can access the road condition 302 for various locations stored in a government database, a user-reported or maintained map or database, a service provider, or a combination thereof.

The noise prediction module 504 can include a level, an equation, a method or a process, or a combination thereof associated with various instances or types of the road condition 302 as predetermined by the navigation system 100. The noise prediction module 504 can use the level, the equation, the method or the process, or a combination thereof corresponding to the road condition 302 at the location 202 to determine the noise prediction 220 at the location 202 based on the road condition 302.

The noise prediction module 504 can determine the noise prediction 220 based on the road condition 302 including construction on or near the road. The construction can include any building or repairs performed on or near the road. The road construction can include road resurfacing, road demolition, building or sidewalk construction adjacent to the road, or a combination thereof. The construction can further include construction for a building or a structure abutting the road at the location 202 or within a predetermined threshold distance from the location 202.

The construction can include use of heavy machinery or temporary alterations in the existing road. For example, if there were construction on the road or adjacent to the road, the use of jack hammers or resurfacing equipment can increase the noise level in the area.

The noise prediction module 504 can determine the noise prediction 220 based on information accessed by municipal database or record, using user or community provided or reported data, or a combination thereof. The noise prediction module 504 can further identify a phase, an associated equipment, or a combination thereof corresponding to the construction to determine the noise prediction 220 at the location 202. The noise prediction module 504 can determine a higher instance of the noise prediction 220 for the location 202 according to the road condition 302 including the construction.

The noise prediction module 504 can include a model, an equation, a level or a value, a method or a process, or a combination thereof corresponding to different instance or type of the construction, the phase thereof, the equipment associated thereto, or a combination thereof predetermined by the navigation system 100. The noise prediction module 504 can use the model, the equation, the level or the value, the method or the process, or a combination thereof corresponding to the identification for the construction to determine the noise prediction 220 for the location 202 associated with the construction.

The noise prediction module 504 can determine the noise prediction 220 based on the weather condition 304 of FIG. 3. For example, a hailstorm can affect only a limited area or a single neighborhood along a destination route. Similarly, a certain stretch of highway can be known for high winds. The weather condition 304 can be used to represent the noise contribution at the location 202 based on the atmospheric condition. For example, during a hail storm the noise level inside the user vehicle 224 would increase due to the hail hitting the vehicle 224.

The noise prediction module 504 can identify the weather condition 304 at the location 202 based on accessing a weather database, receiving a report from users or members of the navigation system 100, accessing a weather detector or sensor, or a combination thereof to determine the noise prediction 220 at the location 202. The noise prediction module 504 can include a model, a level, a method or a process, or a combination thereof for representing various weather patterns predetermined by the navigation system 100. The noise prediction module 504 can determine the noise prediction 220 using the model, the level, the method or the process, or a combination thereof corresponding to the weather condition 304 at the location 202.

The noise prediction module 504 can determine the noise prediction 220 based on the traffic condition 306 of FIG. 3. For example, the user vehicle 224 would need to travel at a slower speed in a particular a stretch of highway during a period of heavy traffic. The noise level based on the traffic condition 306 would be different during periods of heavy traffic for the same stretch of highway than during periods of no traffic. In another example, if a highway was known to have a high percentage of large trucks on its roads at a certain time of day, the noise prediction module 504 can assign a higher noise prediction 220 for the location 202.

The noise prediction module 504 can identify the traffic condition 306 at the location 202 using information from a community of users, governmental traffic departments, traffic sensors, or a combination thereof. The noise prediction module 504 can determine the noise prediction 220 for information associated with the traffic condition 306. For example, the noise prediction module 504 can include number of vehicles, traffic speed, average number of oversized vehicles, or a combination thereof for various locations. The noise prediction module 504 can use various types of information to determine the noise prediction 220 based on the traffic condition 306 for the location 202.

The noise prediction module 504 can include a model, a level, a method or a process, or a combination thereof for representing various traffic patterns predetermined by the navigation system 100. The noise prediction module 504 can determine the noise prediction 220 using the model, the level, the method or the process, or a combination thereof corresponding to the traffic condition 306 at the location 202.

The noise prediction module 504 can determine the noise prediction 220 based on the speed change 310 of FIG. 3 at an anticipated event. The anticipated event can represent any expected event along the destination route. The anticipated event can include the speed change 310. The anticipated event can vary in the length of time required to complete the event. The anticipated event can include a stop sign, entering a highway, exiting a highway, or a combination thereof. The anticipated event can include a maneuver related to following or traversing a given route.

For example, the noise prediction module 504 can determine the noise prediction 220 based on the traffic in front of a school during dismissal time. The changes in the speed of the car due to children crossing the street can increase the noise prediction 220 for that area by decreasing the noise level generated by movement of the device as the vehicle 224 slows or stops.

In another example, when entering a highway, the user is expected to increase the vehicle speed to match with the highway traffic. The acceleration of the vehicle 224 can increase the amount of noise inside the vehicle 224. The navigation system 100 can use the information from the anticipated event to adjust the noise level contribution in the location 202 of the anticipated event.

The noise prediction module 504 can determine the noise prediction 220 based on the specific maneuver 308 of FIG. 3. For example, the noise level contribution could be different at an intersection if the vehicle 224 travels through the intersection versus turning left. The noise prediction module 504 can include a model, a level, a method or a process, or a combination thereof for representing various maneuvers predetermined by the navigation system 100. The noise prediction module 504 can determine the noise prediction 220 using the model, the level, the method or the process, or a combination thereof corresponding to the specific maneuver 308 at the location 202.

The noise prediction module 504 can use the first communication unit 416, the second communication unit 436, or a combination thereof to communicate the accessed data between devices. The route calculation module 502 can use the first storage unit 414, the second storage unit 446, or a combination thereof to store the noise prediction 220 at the location 202. The noise prediction module 504 can use the first control unit 412, the second control unit 434, or combination thereof to determine the noise prediction 220 at the location 202. The noise prediction module 504 can use the first user interface 418, the second user interface 438, the first communication interface 428, the second communication interface 450, the first control interface 422 of FIG. 4, the second control interface 444 of FIG. 4, the first storage interface 424 of FIG. 4, the second storage interface 448 of FIG. 4, or a combination thereof to display information to the user.

The noise prediction module 504 can pass information to the preference module 506, the route calculation module 502, or a combination thereof. After determining the noise prediction 220 at the location 202, the control flow can pass from the noise prediction module 504 to the preference module 506. The control flow can pass by having a processing result, such as the noise prediction 220 as an output from the noise prediction module 504 to the input of the preference module 506 and subsequently to the output module 508. The control flow can further pass by storing the processing result at the location 202 known and accessible to the preference module 506. The control flow can further pass by notifying the preference module 506, such as by using a flag, an interrupt, a status signal, or a combination thereof. The control flow can further pass using a combination of the processes described above.

The preference module 506 is configured to identify the user preferences 216 for noise level at the location 202. The preference module 506 can store user preferences 216 provided by the user to set the output characteristic 208.

The preference module 506 can identify minimum values, maximum values, threshold values, or a combination thereof for the output characteristic 208. The preference module 506 can include a level, an equation, a method or a process, or a combination thereof associated with various instances or types of the user preferences 216 as predetermined by the navigation system 100.

For example, when a user travels to an unfamiliar location and needs to hear the navigation system clearly in order to avoid any delay in arrival time, the preference module 506 can set the minimum acceptable voice quality 212 of FIG. 2 and visual quality 214 of FIG. 2. The preference module 506 can identify a threshold value based on initial baseline measurements. If the noise level was predicted to increase by an arbitrary value set by the user or device at any location, the navigation system 100 would adjust the output characteristic 208. In a further example, the navigation system 100 can set a maximum value for the voice quality 212 of the output characteristic 208 to 80 decibels to prevent hearing loss. The preference module 506 can save the user preferences 216 and limit the maximum output volume regardless of the noise level or noise prediction 220.

The preference module 506 can further identify the user preferences 216 based on identifying baseline settings for the output characteristic 208 preferred by the user. The preference module 506 can identify the baseline settings by interacting with the user to receive user preferences information, such as for intensity, volume, tone, voice selection, brightness, hue, contrast, theme, or a combination thereof.

The preference module 506 can use the first user interface 418, the second user interface 438, the first communication unit 416, the second communication unit 436, or a combination thereof to identify the baseline settings. The preference module 506 can store the baseline settings in the first storage unit 414, the second storage unit 446, or a combination thereof. The navigation system 100 can adjust the baseline settings based on the projected or estimated noise at various locations for the output characteristic 208.

The preference module 506 can use the first communication unit 416, the second communication unit 436, or a combination thereof to communicate the accessed data between devices. The preference module 506 can use the first storage unit 414, the second storage unit 446, or a combination thereof to store user preferences 216. The preference module 506 can use the first control unit 412, the second control unit 434, of combination thereof to identify user preferences 216 for the preferred route 222 and determine maximum value, minimum values, and threshold values for the preferred route 222. The preference module 506 can use the first user interface 418, the second user interface 438, the first communication interface 428, the second communication interface 450, the first control interface 422, the second control interface 444, the first storage interface 424, the second storage interface 448, or a combination thereof to display information to the user.

The preference module 506 can pass information to the output module 508 and the route calculation module 502. After identifying user preferences 216 at the location 202, the control flow can pass from the preference module 506 to the output module 508 or the route calculation module 502. The control flow can pass by having a processing result, such as the maximum values, the minimum values, threshold values, or combination as an output from the preference module 506 to the input of the output module 508, the route calculation module 502, or a combination thereof. The control flow can further pass by storing the processing result at the location 202 known and accessible to the output module 508, the route calculation module 502, or combination thereof. The control flow can further pass by notifying the output module 508, route calculation module 502, or combination thereof, such as by using a flag, an interrupt, a status signal, or a combination thereof. The control flow can further pass using a combination of the processes described above.

The output module 508 is configured to generate the output characteristic 208 based on the location 202. The output module 508 can generate the output characteristic 208 based on the location 202 for controlling the content communication 210 with the control unit 434. The output module 508 can generate the output characteristic 208 based on the noise prediction 220 for the speed change 310, the specific maneuver 308, trigger condition 314, weather condition 304, traffic condition 306, road condition 302, or a combination thereof at the location 202.

The output module 508 can generate the output characteristic 208 based on the noise prediction 220 at the location 202. The output module 508 can generate the output characteristic 208 based on a level, an equation, a method or a process, or a combination thereof of the noise prediction 220 associated with any maneuver, event, condition, or combination thereof at the location 202.

The output module 508 can use the minimum values, maximum value, threshold value or a combination thereof to generate the output characteristic 208 of the navigation system 100. The output module 508 can generate the output characteristic 208 by controlling the voice quality 212, visual quality 214, or a combination thereof applicable to the content communication 210 for the device. For example, the preference module 506 can set the threshold value to an arbitrary value. Based on meeting the trigger condition 314 associated with entering a highway, the output module 508 can alter the voice quality 212 of the navigation system 100 when the noise prediction 220 exceeds the threshold value.

The output module 508 can generate the output characteristic 208 based on a decibel volume of the voice quality 212. The output module 508 can increase the volume to exceed the noise prediction 220 at the location 202.

The output module 508 can generate the output characteristic 208 based on the frequency and pitch of the voice quality 212. For example, increasing the volume of the navigation system 100 to exceed the noise prediction 220 at the location 202 can exceed the maximum value. The output module 508 can adjust the frequency and pitch of the content communication 210 instead.

In another example, when the preferred route 222 includes a large section of predicted low frequency noise, the output module 508 can generate the output characteristic 208 based on increasing the high-frequency component or increasing the base or carrier frequency. The frequency output can also include the harmonics of the voice quality 212.

The output module 508 can generate the output characteristic 208 based on additional tones to notify the user of content communication 210. The output module 508 can generate the output characteristic 208 based on timing of the content communication 210 to avoid the location where the noise prediction 220 exceeds acceptable value. The output module 508 can generate the output characteristic 208 by controlling attributes of the navigation system 100 including display brightness, display color palette, and components indirectly associated to the navigation system 100 such as interior cabin lights, cabin entertainment system or a combination thereof.

The output module 508 can generate the output characteristic 208 based on a level, an equation, a method or a process, or a combination thereof. The output module 508 can generate the output characteristic 208 based on the minimum value, maximum values, threshold values, noise prediction 220, time of day, passenger profile 218 of FIG. 2, or a combination thereof.

The output module 508 can generate the output characteristic 208 based on the time of day. For example, at night when the noise prediction 220 in a location exceeds the maximum value for acceptable noise levels, the output module 508 can increase the volume of the navigation system 100 to the maximum value and increase the brightness of the navigation display to alert the driver to content communication 210.

The output module 508 can generate the output characteristic 208 based on the passenger profile 218. For example, when the vehicle 224 is full of passengers, the noise level inside the vehicle 224 can be greater than when the vehicle 224 contains only one passenger. The output module 508 can generate the output characteristic 208 based on a value associated with the passenger number, age, specific identity, or a combo thereof. In a further example, a value can be associated with a time corresponding to the specific identity, such as after an activity or associated with physiological pattern or rhythm. The output module 508 can generate a different output characteristic 208 when dropping off a vehicle 224 full of children to school than picking up the children from school. The navigation system 100 can use the passenger profile 218 in combination with the noise prediction 220 to suggest the expected noise level and adjust the output characteristic 208 if the noise level exceeded the threshold value determined by the preference module 506.

The output module 508 can further generate and communicate the communication content 210. The output module 508 can generate the communication content 210 by identifying content message intended for communication to the user. The content message can include guidance for a specific maneuver, a relevant warning or notice regarding the user's context, an update for a status or surrounding context, or a combination thereof.

The output module 508 can generate the communication content 210 including or according to the output characteristic 208 for controlling the content communication communicate to the user through the first device 102. The output module 508 can set attributes or characteristics of the communication according to the output characteristic 208. For example, the output module 508 can set the volume level, the brightness setting, the tone setting, background setting, or a combination thereof according to the output characteristic 208.

The output module 508 can apply the output characteristic 208 using the first control interface 422 of FIG. 4, the second control interface 434 of FIG. 4, the first user interface 418, the second user interface 438, or a combination thereof. The output mode 508 can communicate the communication content 210 to the user according to or using the output characteristic 208. The output mode 508 can communicate to the user through the first user interface 418, the second user interface 438, or a combination thereof. The output module 508 can communicate information, such as the output characteristic 208 or the communication content 210, between devices using the first communication unit 416, the second communication unit 436, or a combination thereof.

Using the output characteristic 208, the output module 508 can communicate the communication content 210 distinguishable from the noise at the relevant location. For example, the communication content 210 according to the output characteristic 208 can be communicated to overwhelm and rise above the magnitude of the noise, be perceived clearer and sharper than or through the noise, or a combination thereof. Also for example, the communication content 210 according to the output characteristic 208 can be tailored to the locations along the preferred route.

It has been discovered that the output characteristic 208 based on or specific for the location 202 for controlling communication of the content communication 210 provides increased safety and usability. The output characteristic 208 can be generated based on the noise prediction 220 for communicating the content communication 210 different from or exceeding the noise estimate at the location 202. The distinction can ensure that the user clearly receives the content communication 210, reducing errors or attention loss associated with missed communications.

It has further been discovered that the output characteristic 208 dynamically generated for the current location 204 provides flexibility for real time processing of the content communication 210. The output characteristic 208 can be dynamically generated based on the noise prediction 220 at the current location 204 as discussed above. The dynamic and real-time generation for the noise prediction 220 can ensure that the user clearly receives the content communication 210 without needing to manually change the volume of the navigation device as the noise level changes. The distinction also can also provide output characteristic variations for navigational command and non-navigational commands allowing the user to focus on the higher priority messages.

It has further been discovered that the output characteristic 208 based on the noise prediction 220 along the preferred route 222 intended for traversal by the user provides increased adaptability for the navigation system. The prediction of the noise level along the route prior to reaching the location can prepare appropriate settings instead of processing at the location. This allows the navigation system 100 to respond to an upcoming change in noise level instead of responding to the noise based on a direct input, which can delay communication of timing-crucial information.

It has further been discovered that the preferred route 222 calculated based on the noise prediction 220 provides increased safety and confidence for the user. The preferred route 222 calculated using the noise prediction 220 as a condition or a parameter targeted for qualifying the route can ensure effective communication along the preferred route 222. Consistently effective communication of instructions or guidance can provide the increased safety, while increasing the comfort level and the confidence of the user relying on the communications, regardless of the user's familiarity with the geographic area.

It has further been discovered that the output characteristic 208 based on the noise prediction 220 corresponding to the trigger condition 314 and the maneuver condition 312 provides further increased safety and confidence for the user. The navigation system 100 can adjust the output characteristic 208 before and specific to each occurrence of communication. This allows the navigation system to adjust the output characteristic 208 gradually between the trigger condition 314 and maneuver condition 312.

It has further been discovered that the output characteristic 208 based on the passenger profile 218 provides increased usability. The output characteristic 208 can ensure that the user clearly receives the communication based on accounting for factors within the vehicle 224 affecting communication.

It has further been discovered that the output characteristic 208 based on environmental conditions, including the road condition 302, the weather condition 304, the traffic condition 306, or a combination thereof, can provide increased safety. The output characteristic 208 determined by the noise prediction 220 at the location based on environmental conditions can ensure that the user receives communication accounting for the environmental conditions. The ensured timely communication can lead to the user safely following the guidance without diverting unnecessary attention to deciphering unclear communication.

It has further been discovered that the output characteristic 208 based on the noise prediction 220 corresponding to physical movement of the user traversing along the preferred route 222, including the speed change 310, the specific maneuver 308, or a combination thereof for representing physical movement of a vehicle 224 in traversing the preferred route 222, provides improved power efficiency. The output characteristic 208 based on physical movement of the user can selectively control the output characteristic 208 instead of keeping it at a constant output, thereby saving battery life.

The output module 508 can use the first communication unit 416, the second communication unit 436, or a combination thereof to communicate the accessed data between devices. The route calculation module 502 can use the first storage unit 414, the second storage unit 446 to store the output characteristic 208. The output module 508 can use the first control unit 412, the second control unit 434, of combination thereof to generate the output characteristic 208 for the preferred route 222. The output module 508 can use the first user interface 418, the second user interface 438, the first communication interface 428, the second communication interface 450, the first control interface 422, the second control interface 444, the first storage interface 424, the second storage interface 448, or a combination thereof to display information to the user.

Figure 6:
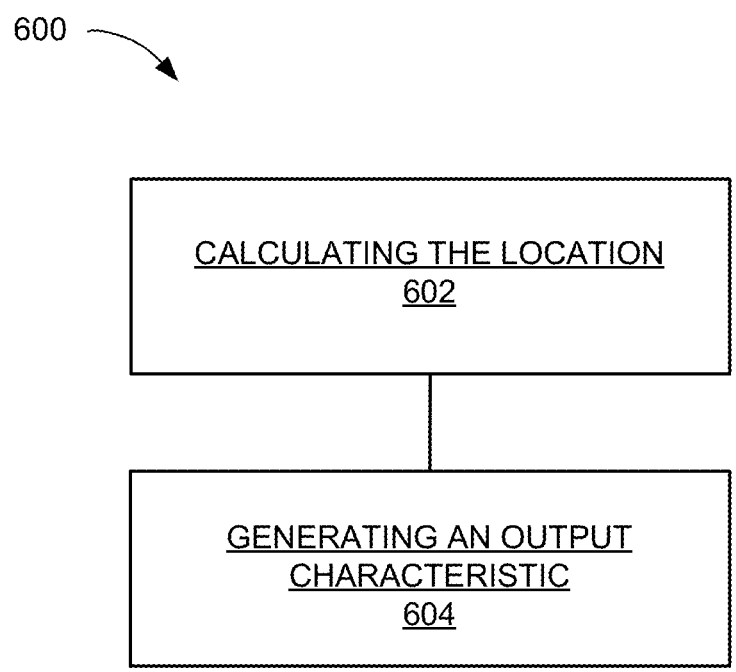
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: calculating a location for representing the location of a device in a box 602; and generating with a control unit an output characteristic based on the location for controlling a content communication to a user through the device in a box 604.

The modules described in this application can be hardware implementation or hardware accelerators, including passive circuitry, active circuitry, or both, in the first storage unit 414 of FIG. 4, the second storage unit 446 of FIG. 4, the first control unit 412 of FIG. 4, the second control unit 434 of FIG. 4, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage unit 414, the second storage unit 446, the first control unit 412, the second control unit 434, or a combination thereof.

The navigation system 100 has been described with module functions or order as an example. The navigation system 100 can partition the modules differently or order the modules differently. For example, the navigation system 100 can use the preference module 506 to identify user preferences 216 before calculating the route with the route calculation module 502. Also for example, the navigation system 100 can implement the preference module 506, the route calculation module 502, and noise prediction module 504 or a combination thereof in parallel, in series, or a combination of configuration thereof relative to each other.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, or a combination thereof can represent the non-transitory computer readable medium. The first storage unit 414, the second storage unit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the output characteristic 208 of FIG. 2 for the content communication 210 of FIG. 2 results in the movement in the physical world, such as for the content communication 210 displayed or recreated for the user on one or more of the devices or physical displacement of the user carrying the first device 102. Movement in the physical world results in updates to the current location 204 of FIG. 2 which can be fed back into the navigation system 100 and further influence the output characteristic 208, the preferred route 222 of FIG. 2, the noise prediction 220 of FIG. 2, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    calculating a location, including a future location, for representing the location of a device;
    determining a noise prediction representing physical movement of a vehicle at the future location as an expected noise level at a future time at which the device is estimated to be traveling through the future location;
    dynamically generating with a control unit an output characteristic based on the noise prediction at the location, the output characteristic for controlling one or more characteristic or trait of a content communication, including a volume level, tailored to enable the content communication to be audible over the expected noise level at the location; and
    adjusting the volume level of the device according to the output characteristic to communicate the content communication to a user through the device.

2. The method as claimed in claim 1 wherein;
    determining the noise prediction includes determining the noise prediction as an estimate of a magnitude, a characteristic, an effect, or a combination thereof for the noise from each of the applicable sources or causes at the location.

3. The method as claimed in claim 1 wherein generating the output characteristic includes generating the output characteristic for controlling voice quality, visual quality, or a combination thereof applicable to the content communication for the device.

4. The method as claimed in claim 1 wherein:
    calculating the location includes calculating a current location corresponding to the device; and
    determining the noise prediction for the current location, the future location, or a combination thereof.

5. The method as claimed in claim 1 further comprising:
    identifying user preferences for representing the user;
    calculating a preferred route based on the noise prediction and the user preferences for providing the output characteristic of the content communication exceeding the noise prediction along the preferred route.

6. The method as claimed in claim 1 further comprising:
    calculating a preferred route for representing the preferred route intended for traversal by the user; and
    wherein:
    determining the location include determining the location along or adjacent to the preferred route; and
    generating the output characteristic includes generating the output characteristic for communicating the content communication to the user traversing along the preferred route.

7. The method as claimed in claim 6 wherein:
    calculating the preferred route includes calculating the preferred route including a maneuver condition for traversing according to the preferred route, and including a trigger condition preceding the maneuver condition along the preferred route for notifying the user through the content communication before the maneuver condition; and
    generating the output characteristic includes generating the output characteristic based on the noise prediction for the trigger condition.

8. The method as claimed in claim 1 further comprising:
    determining a passenger profile for representing one or more passengers in a vehicle along with the user; and wherein:
generating the output characteristic includes generating the output characteristic based on the passenger profile.

9. The method as claimed in claim 1 wherein generating the output characteristic includes generating the output characteristic based on a road condition, a weather condition, a traffic condition, or a combination thereof along the preferred route.

10. The method as claimed in claim 1 wherein generating the output characteristic includes generating the output characteristic based on a speed change, a specific maneuver, or a combination thereof for representing physical movement of a vehicle in traversing the preferred route.

11. A navigation system comprising:
a communication interface configured to calculate a location, including a future location, for representing the location of a device; and
a control unit, coupled to the communication interface, configured to:
determine a noise prediction representing physical movement of a vehicle at the future location as an expected noise level at a future time at which the device is estimated to be traveling through the future location;
dynamically generate an output characteristic based on the noise prediction at the location, the output characteristic for controlling one or more characteristic or a trait of a content communication, including a volume level, tailored to enable the content communication to be audible over the expected noise level at the location; and
adjust the volume level of the device according to the output characteristic to communicate the content communication to a user through the device.

12. The system as claimed in claim 11 wherein the control unit is configured to:
determine the noise prediction as an estimate of a magnitude, a characteristic, an effect, or a combination thereof for the noise from each of the applicable sources or causes at the location.

13. The system as claimed in claim 11 wherein the control unit is configured to generate the output characteristic for controlling voice quality, visual quality, or a combination thereof applicable to the content communication for the device.

14. The system as claimed in claim 11 wherein:
the communication interface is configured to calculate a current location corresponding to the device; and
the control unit is configured to determine the noise prediction for the current location, the future location, or a combination thereof.

15. The system as claimed in claim 11 wherein the control unit is configured to:
identify user preferences for representing the user;
calculate a preferred route based on the noise prediction and the user preferences for providing the output characteristic of the content communication exceeding the noise prediction along the preferred route.

16. A non-transitory computer readable medium including instructions for a navigation system comprising:
calculating a location, including a future location, for representing the location of a device;
determining a noise prediction representing physical movement of a vehicle at the future location as an expected noise level at a future time at which the device is estimated to be traveling through future the location;
dynamically generating an output characteristic based on the noise prediction at the location, the output characteristic for controlling one or more characteristic or trait of a content communication, including a volume level, tailored to enable the content communication to be audible over the expected noise level at the location; and
adjusting the volume level of the device with the control unit according to the output characteristic to communicate the content communication to a user through the device.

17. The non-transitory computer readable medium as claimed in claim 16 further comprising:
determining the noise prediction includes determining the noise prediction as an estimate of a magnitude, a characteristic, an effect, or a combination thereof for the noise from each of the applicable sources or causes at the location,
wherein:
generating the output characteristic includes generating the output characteristic based on the noise prediction.

18. The non-transitory computer readable medium as claimed in claim 16 wherein generating the output characteristic includes generating the output characteristic for controlling voice quality, visual quality, or a combination thereof applicable to the content communication for the device.

19. The non-transitory computer readable medium as claimed in claim 16 wherein:
calculating the location includes calculating a current location corresponding to the device; and
determining the noise prediction for the current location, the future location, or a combination thereof.

20. The non-transitory computer readable medium as claimed in claim 16 further comprising:
identifying user preferences for representing the user;
calculating a preferred route based on the noise prediction and the user preferences for providing the output characteristic of the content communication exceeding the noise prediction along the preferred route.

* * * * *